(12) United States Patent
Liu

(10) Patent No.: US 12,423,890 B2
(45) Date of Patent: Sep. 23, 2025

(54) METHOD AND APPARATUS FOR DATA VISUALIZATION BASED ON CHART

(71) Applicant: Beijing Volcano Engine Technology Co., Ltd., Beijing (CN)

(72) Inventor: Yang Liu, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/818,276

(22) Filed: Aug. 28, 2024

(65) Prior Publication Data

US 2025/0131619 A1  Apr. 24, 2025

(30) Foreign Application Priority Data

Oct. 24, 2023 (CN) .......................... 202311386130.9

(51) Int. Cl.
| | | |
|---|---|---|
| *G06T 11/20* | (2006.01) | |
| *G06F 40/109* | (2020.01) | |
| *G06T 11/60* | (2006.01) | |

(52) U.S. Cl.
CPC .......... *G06T 11/206* (2013.01); *G06F 40/109* (2020.01); *G06T 11/60* (2013.01)

(58) Field of Classification Search
None
See application file for complete search history.

(56) References Cited

U.S. PATENT DOCUMENTS

| | | | | |
|---|---|---|---|---|
| 2005/0162423 A1* | 7/2005 | Goggin | ................. | G06T 11/206 345/440 |
| 2010/0251151 A1* | 9/2010 | Alsbury | ................ | G06F 1/1626 345/440.2 |
| 2011/0109632 A1* | 5/2011 | Gorev | .................... | G06T 11/206 715/764 |
| 2017/0091969 A1* | 3/2017 | Daems | .................. | G06T 11/206 |
| 2018/0005418 A1* | 1/2018 | Kim | ...................... | G06T 11/206 |
| 2018/0067625 A1* | 3/2018 | Kim | ....................... | G06T 11/206 |
| 2018/0150981 A1* | 5/2018 | Schneider | ............. | G06T 11/206 |
| 2018/0165844 A1* | 6/2018 | Kirichenko | ........... | G06T 11/206 |
| 2019/0130615 A1* | 5/2019 | Belofastow | ............. | G06T 11/60 |
| 2024/0169143 A1* | 5/2024 | Tendolkar | ............ | G06V 30/412 |

FOREIGN PATENT DOCUMENTS

CN             109308203 A   *  2/2019  ........... G06F 40/106

* cited by examiner

*Primary Examiner* — Andrew G Yang
(74) *Attorney, Agent, or Firm* — Alleman Hall & Tuttle LLP

(57) ABSTRACT

The present application discloses a method for data visualization based on a chart, including: obtaining a size of a target number axis of a chart to be processed; obtaining a font size of a text label corresponding to the target number axis, and determining a proper label spacing corresponding to the target number axis according to the font size, wherein the proper label spacing is a space between any two adjacent text labels and enabling that the text labels included in the target number axis do not overlap; determining, according to the size and the proper label spacing, a quantity of the text labels included in the target number axis; and rendering the chart to be processed based on the quantity of the text labels and chart data of the chart to be processed.

15 Claims, 3 Drawing Sheets

METHOD AND APPARATUS FOR DATA VISUALIZATION BASED ON CHART

CROSS-REFERENCE TO RELATED APPLICATION(S)

This application claims priority to Chinese Application No. 202311386130.9 filed in Oct. 24, 2023, the disclosure of which is incorporated herein by reference in its entity.

FIELD

The present application relates to the field of computer technology, and in particular, to a method and apparatus for data visualization based on a chart.

BACKGROUND

A chart is a form of data representation. A number axis of a chart is a key way to assist the chart in data representation. The number axis of the chart can include one or more text labels. Through the text labels of the number axis of the chart, a user can intuitively learn a range and change trend of data.

In some scenarios, an existing chart may have an improper distribution of text labels, resulting in overlapping the text labels. However, the overlapping of the text labels will affect the efficiency of the user in obtaining information through chart.

Therefore, there is an urgent need for a solution that can solve the above problems.

SUMMARY

In order to solve or at least solve the above technical problems, embodiments of the present application provide a method and apparatus for data visualization based on a chart.

In a first aspect, the embodiments of the present application provide a method for data visualization based on a chart. The method includes: obtaining a size of a target number axis of a chart to be processed; obtaining a font size of a text label corresponding to the target number axis, and determining a proper label spacing corresponding to the target number axis according to the font size, wherein the proper label spacing is a space between any two adjacent text labels and enabling that the text labels included in the target number axis do not overlap; determining, according to the size and the proper label spacing, a quantity of the text labels included in the target number axis; and rendering the chart to be processed based on the quantity of the text labels and chart data of the chart to be processed.

Optionally, the method further includes: obtaining a line spacing for the text label corresponding to the target number axis, wherein determining the proper label spacing corresponding to the target number axis according to the font size includes: determining the proper label spacing according to the font size and the line spacing.

Optionally, the determining, according to the size and the proper label spacing, the quantity of the text labels included in the target number axis comprises: determining, according to a result obtained by dividing the size by the proper label spacing, the quantity of the text labels included in the target number axis.

Optionally, the method further includes: obtaining a preset first correction parameter, wherein determining, according to the result obtained by dividing the size by the proper label spacing, the quantity of the text labels included in the target number axis comprises: determining, according to the first correction parameter and the result, the quantity of the text labels included in the target number axis.

Optionally, the method further includes: obtaining a second correction parameter set by a user, wherein the determining, according to the result obtained by dividing the size by the proper label spacing, the quantity of the text labels included in the target number axis comprises: determining, according to the second correction parameter and the result, the quantity of the text labels included in the target number axis.

Optionally, the obtaining the size of the target number axis of the chart to be processed comprises: in response to a chart size adjustment operation performed on the chart to be processed in a presentation interface of the chart to be processed, obtaining an adjusted size of the target number axis, wherein the chart size adjustment operation includes a chart zoom-in operation or a chart zoom-out operation.

Optionally, the obtaining the font size of the text label corresponding to the target number axis comprises: in response to a label font size adjustment operation performed on the chart to be processed in a presentation interface of the chart to be processed, obtaining an adjusted font size of the text label corresponding to the target number axis.

In a second aspect, the embodiments of the present application provide an apparatus for data visualization based on a chart. The apparatus includes: a first obtaining unit configured to obtain a size of a target number axis of a chart to be processed; a second obtaining unit configured to obtain a font size of a text label corresponding to the target number axis; a first determining unit configured to determine a proper label spacing corresponding to the target number axis according to the font size, wherein the proper label spacing is a space between any two adjacent text labels and enabling that the text labels included in the target number axis do not overlap; a second determining unit configured to determine, according to the size and the proper label spacing, a quantity of the text labels included in the target number axis; and a rendering unit configured to render the chart to be processed based on the quantity of the text labels and chart data of the chart to be processed.

Optionally, the apparatus further includes: a third obtaining unit configured to obtain a line spacing for the text label corresponding to the target number axis, wherein the first determining unit is configured to determine the proper label spacing according to the font size and the line spacing.

Optionally, the second determining unit is configured to determine, according to a result obtained by dividing the size by the proper label spacing, the quantity of the text labels included in the target number axis.

Optionally, the apparatus further includes: a fourth obtaining unit configured to obtain a preset first correction parameter, wherein the second determining unit is configured to: determine, according to the first correction parameter and the result, the quantity of the text labels included in the target number axis.

Optionally, the apparatus further includes: a fifth obtaining unit configured to obtain a second correction parameter set by a user, wherein the second determining unit is configured to determine, according to the second correction parameter and the result, the quantity of the text labels included in the target number axis.

Optionally, the first obtaining unit is configured to, in response to a chart size adjustment operation performed on the chart to be processed in a presentation interface of the chart to be processed, obtain an adjusted size of the target number axis, wherein and the chart size adjustment operation includes a chart zoom-in operation or a chart zoom-out operation. Optionally, the second obtaining unit is configured to, in response to a label font size adjustment operation performed on the chart to be processed in a presentation interface of the chart to be processed, obtain an adjusted font size of the text label corresponding to the target number axis.

In a third aspect, the embodiments of the present application provide an electronic device including a processor and a memory, wherein the processor is configured to execute instructions stored in the memory to cause the device to perform any method in the above first aspect.

In a fourth aspect, the embodiments of the present application provide a computer-readable storage medium including instructions, wherein the instructions instruct a device to perform any method in the above first aspect.

In a fifth aspect, the embodiments of the present disclosure provide a computer program product. The computer program product, when run on a computer, causes the computer to perform any method in the above first aspect.

Compared with the prior art, the embodiments of the present application have the following advantages.

The embodiments of the present application provide a method for data visualization based on a chart. For a chart to be processed, a proper quantity of text labels can be determined for a target number axis of the chart to be processed, so that the text labels of the target number axis will not overlap. Specifically, considering that the quantity of text labels that can be contained in the target number axis is affected by the size of the target number axis, the size of the target number axis can be obtained. In addition, a font size of the text label corresponding to the target number axis can represent a text size corresponding to the text labels, and the text size can be used for determining a proper label spacing corresponding to the target number axis. The proper label spacing is a space between any two adjacent text labels and enabling that the text labels included in the target number axis do not overlap. Therefore, the font size of the text label corresponding to the target number axis can be obtained, and the proper label spacing corresponding to the target number axis can be further determined according to the font size. After the proper label spacing is determined, a quantity of the text labels included in the target number axis can be further determined according to the aforementioned size of the target number axis and the aforementioned proper label spacing. After the quantity of the text labels included in the target number axis is determined, the chart to be processed can be rendered based on the quantity of the text labels and chart data of the chart to be processed. In the embodiments of the present application, the proper label spacing determined in conjunction with the font size of the text label can ensure that the text labels will not overlap. Correspondingly, the quantity, determined based on the size and the proper label spacing, of the text labels included in the target number axis is a proper label quantity that enables that the text labels of the target number axis do not overlap. Therefore, the target number axis of the chart to be processed that is rendered based on the quantity and the chart data of the chart to be processed does not have the problem of overlapping of text labels.

BRIEF DESCRIPTION OF THE DRAWINGS

To describe the technical solutions in the embodiments of the present application or in the related art more clearly, the following briefly introduces the accompanying drawings for describing the embodiments or the related art. Apparently, the accompanying drawings in the following description show merely some embodiments recorded in the present application, and a person of ordinary skilled in the art may still derive other drawings from the accompanying drawings without creative efforts.

DETAILED DESCRIPTION OF EMBODIMENTS

In order to make a person skilled in the art to better understand the solutions of the present application, the technical solutions in the embodiments of the present application are clearly and completely described below with reference to the accompanying drawings in the embodiments of the present application. Apparently, the described embodiments are merely some rather than all of the embodiments of the present application. All other embodiments obtained by a person of ordinary skilled in the art based on the embodiments of the present application without making creative efforts shall fall within the protection scope of the present application.

Various nonrestrictive implementations of the present application will be explained in detail below in conjunction with the accompanying drawings.

Exemplary Method

Figure 1:
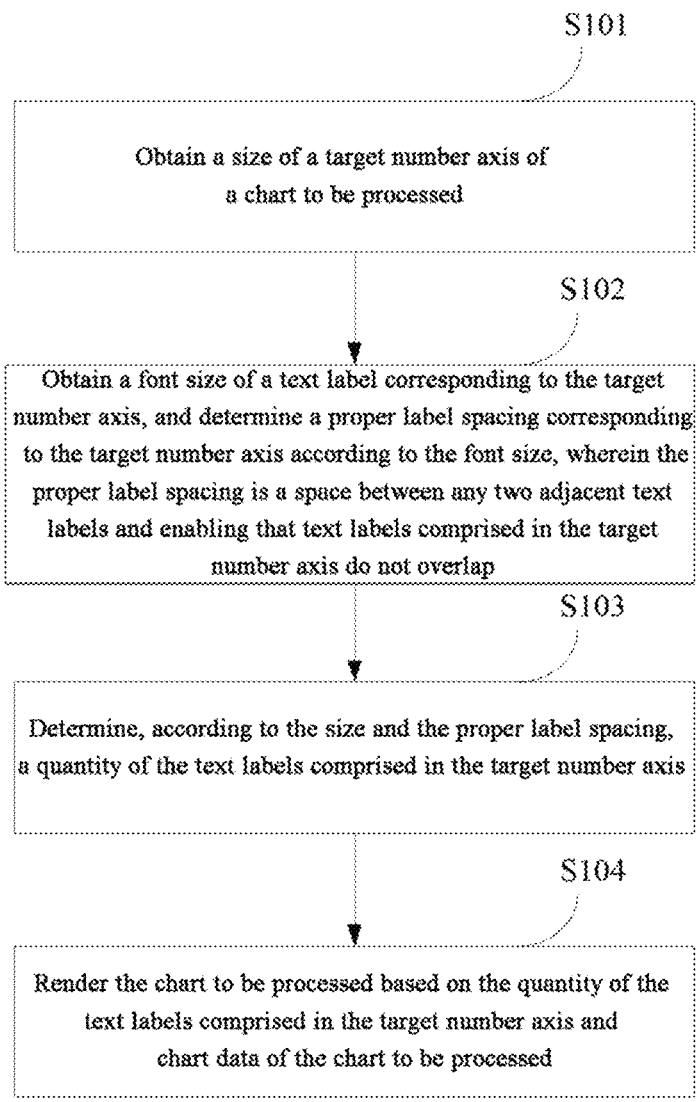
FIG. 1 is a flowchart of a method for data visualization based on a chart provided according to an embodiment of the present application.

Referring to FIG. 1, this figure shows a flowchart of a method for data visualization based on a chart provided according to an embodiment of the present application. In this embodiment, the method can be performed by a client, or a server. The embodiments of the present application do not specifically limit this. In the following descriptions, performing the method by a client is taken as an example for explanation.

In an example, the method may, for example, include the following steps: S101-S104.

In an example, the client executes S101-S104 once every time it performs a chart rendering operation on a chart to be processed.

At S101: a size of a target number axis of a chart to be processed is obtained. In embodiments of the present application, the target number axis can be either a horizontal number axis or a vertical number axis. In some scenes, the horizontal number axis may alternatively be referred to as an X-axis, and the vertical number axis may alternatively be referred to as a Y-axis. When the target axis is the horizontal number axis, the size of the target axis can be a width of the chart to be processed. When the target number axis is the vertical number axis, the size of the target number axis can be a height of the chart to be processed.

In embodiments of the present application, the size of the target number axis can be set by a user.

In an example, the user can trigger a chart creation operation based on chart data. Before triggering the chart creation operation, the user can set the size of the target number axis. In other words, in an example, during specific implementation, S101 can be that, in response to the chart creation operation, the size of the target number axis set by the user is obtained.

In another example, after the chart to be processed is presented, the user can further trigger a chart size adjustment operation on the chart to be processed on a presentation interface of the chart to be processed. For example, the user can trigger a chart zoom-in operation or a chart zoom-out operation on the chart to be processed. For this situation, during specific implementation, S101 may be that: in response to the chart size adjustment operation performed on the chart to be processed in the presentation interface of the chart to be processed, an adjusted size of the target number axis is obtained.

In embodiments of the present application, the chart to be processed can be a chart corresponding to continuous variables.

At S102: a font size of a text label corresponding to the target number axis is obtained, and a proper label spacing corresponding to the target number axis is determined according to the font size, wherein the proper label spacing is a space between any two adjacent text labels and enabling that the text labels included in the target number axis do not overlap.

In embodiments of the present application, the font size of the text label may be set by the user.

In an example, the user can trigger the chart creation operation based on chart data. Before triggering the chart creation operation, the user can set the font size of the text label. In other words, in an example, during specific implementation, "the font size of the text label corresponding to the target number axis is obtained" can be that: in response to the chart creation operation, the font size of the text label set by the user is obtained.

In another example, after the chart to be processed is presented, the user can further trigger a label font size adjustment operation on the chart to be processed on a presentation interface of the chart to be processed. For example, the user can trigger a font size zoom-in operation or a font size zoom-out operation on the font size of the label of the target number axis of the chart to be processed. In this situation, during specific implementation, "the font size of the text label corresponding to the target number axis is obtained" can be that: in response to the label font size adjustment operation performed on the chart to be processed in the presentation interface of the chart to be processed, an adjusted font size of the text label corresponding to the target number axis is obtained.

In embodiments of the present application, the font size of the text label corresponding to the target number axis can represent a text size corresponding to the text label, and the text size can be used for determining the proper label spacing corresponding to the target number axis. Therefore, the proper label spacing can be determined based on the font size. The proper label spacing is a space between any two adjacent text labels and enabling that the text labels included in the target number axis do not overlap. In other words, the proper label spacing can be a spacing that can completely contain a certain text label. Alternatively, the certain text label can be completely presented in a presentation region corresponding to the proper label spacing. It is precisely because the certain text label can be completely presented in the presentation region corresponding to the proper label spacing. Therefore, presenting a text label in a presentation region corresponding to a proper label spacing can ensure that any two adjacent text labels included in the target number axis do not overlap.

In an example, the proper label spacing can be understood as a minimum label spacing that can ensure that any two adjacent text labels included in the target number axis do not overlap.

In an example, the font size can be determined as the proper label spacing.

In another example, during the presentation of the text label, it is necessary to consider both the font size of the text label and a line spacing for the text label. Correspondingly, an actual presentation size of the text label is further related to the aforementioned line spacing. Therefore, the line spacing for the text label corresponding to the target number axis may be further obtained, and the proper label spacing is determined according to the font size and the line spacing. For example, a product of the line spacing and the font size can be determined as the proper label spacing.

In embodiments of the present application, the line spacing for the text label may be set by the user.

In an example, the user can trigger the chart creation operation based on chart data. Before triggering the chart creation operation, the user can set the line spacing for the text label. In other words, in an example, during implementation, "the line spacing for the text label corresponding to the target number axis is obtained" can be that: in response to the chart creation operation, the line spacing for the text label set by the user is obtained.

In another example, after the chart to be processed is presented, the user can further trigger a label line spacing adjustment operation on the chart to be processed on a presentation interface of the chart to be processed. In this situation, during specific implementation, "the line spacing for the text label corresponding to the target number axis is obtained" can be that: in response to the label line spacing adjustment operation performed on the chart to be processed, an adjusted line spacing for the text label corresponding to the target number axis is obtained.

At S103: a quantity of the text labels included in the target number axis is determined, according to the size and the proper label spacing.

After the size and the proper label spacing are determined, the quantity of the text labels included in the target number axis can be determined according to the size and the proper label spacing. In a specific example, the quantity of the text labels included in the target number axis can be determined according to a result obtained by dividing the size by the proper label spacing. For example, the result can be rounded (such as up or down) to obtain the quantity of the text labels included in the target number axis.

In an example, considering that in practical applications, some texts have a special format (for example, a presentation format of time is special), and a size of a presentation region needing to be occupied is larger than the font size or a product of the font size and the line spacing thereof. In this case, the quantity of the text labels determined based on the previous result may not be sufficient to ensure that any two adjacent text labels included in the target number axis do not overlap. Therefore, for this case, during the determination of the quantity of the text labels included in the target number axis, a preset first correction parameter may be further used. In other words, the preset first correction parameter can be further obtained; and the quantity of the text labels included in the target number axis can be determined according to the first correction parameter and the result.

In an example, the first correction parameter may be a value less than 1 and greater than 0. In this case, the quantity of the text labels included in the target number axis can be determined according to the product of the first correction parameter and the aforementioned result. For example, the product is rounded up or down to obtain the quantity of the text labels included in the target number axis.

In another example, the first correction parameter may be a value greater than or equal to 1. In this case, the quantity of the text labels included in the target number axis can be determined according to a quotient obtained by dividing the aforementioned result by the first correction parameter. For example, the quotient can be rounded up or down to obtain the quantity of the text labels included in the target number axis.

In a specific example, considering that for the vertical number axis, its text labels may be presented horizontally, the text labels can be completely contained based on the aforementioned proper label spacing. Therefore, in a specific example, in a case that the target number axis is the vertical number axis, the first correction parameter may be equal to 1; and in a case that the target number axis is the horizontal number axis, the first correction coefficient may not be equal to 1.

In an example, considering that in practical applications, the user may intend to customize a distribution density of the text labels of the target number axis. For this case, during the determination of the quantity of the text labels included in the target number axis, a second correction parameter set by the user may be further used. In other words, the second correction parameter set by the user can be further obtained, and the quantity of the text labels included in the target number axis can be determined according to the second correction parameter and the result.

In an example, the quantity of the text labels included in the target number axis can be determined according to a product of the second correction parameter and the aforementioned result. For example, the product is rounded up or down to obtain the quantity of the text labels included in the target number axis.

In another example, the quantity of the text labels included in the target number axis can be determined according to a quotient obtained by dividing the aforementioned result by the second correction parameter. For example, the quotient can be rounded up or down to obtain the quantity of the text labels included in the target number axis.

In still another example, during the determination of the quantity of the text labels included in the target number axis, the aforementioned result, a first correction parameter, and a second correction parameter may be further used. For example, the quantity of the text labels included in the target number axis can be determined according to a product of the first correction parameter, the second correction parameter, and the result. For yet still another example, the quantity of the text labels included in the target number axis can be determined according to a quotient obtained by dividing the aforementioned result by the first correction parameter and the second correction parameter. Other situations will not be elaborated here.

Next, in conjunction with the following equation (1), an implementation for determining the quantity of the text labels included in the target number axis will be introduced.

$$num = \left[\frac{size}{fontSize * lineHight} * constant * density\right] \quad \text{equation (1)}$$

In equation (1):
Num is the quantity of the text labels included in the target number axis;
[ ] is a rounding operator;
size is the size of the target number axis;
fontSize is the font size of the text label;
the font size of the text label is the line spacing for the text label;
constant is the first correction coefficient; and
density is the second correction coefficient.

At S104: the chart to be processed is rendered based on the quantity of the text labels included in the target number axis and chart data of the chart to be processed.

After the quantity of the text labels included in the target number axis is determined, the chart to be processed can be rendered based on the quantity. During the rendering of the chart to be processed, the aforementioned quantity of text labels can be presented on the target number axis in conjunction with the chart data of the chart to be processed.

The chart data of the chart to be processed can be data included in the chart to be processed. The embodiments of the present application does not specifically limit the type of the chart data. The chart data can be any type of data.

According to the above description, it can be seen that in the embodiments of the present application, the proper label spacing determined in conjunction with the font size of the text label can ensure that the text labels will not overlap. Correspondingly, the quantity, determined based on the size and the proper label spacing, of the text labels included in the target number axis is a proper label quantity that enables the text labels of the target number axis not overlap. Further, in a case that the chart to be processed is rendered based on the quantity, the target number axis of the rendered chart to be processed does not have the problem of overlapping of text labels.

In addition, precisely because the quantity of the text labels determined by this solution is proper, there will be no problem such as too many text labels. Therefore, this solution can also make proper use of rendering resources to avoid rendering of too many text labels and reduce the rendering costs.

The above introduces the method for data visualization based on the chart provided in the embodiments of the present application. Hereafter, a chart presentation result after applying the solution provided in embodiments of the present application will be introduced in conjunction with the accompanying drawings.

Figure 2A:
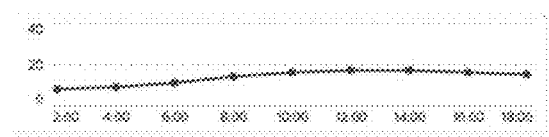
FIG. 2a is a schematic diagram of a chart provided according to an embodiment of the present application.
Figure 2B:
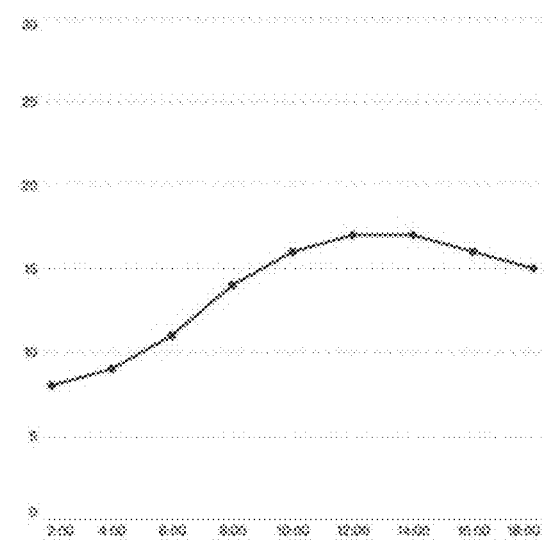
FIG. 2b is a schematic diagram of another chart provided according to an embodiment of the present application.
Figure 2C:
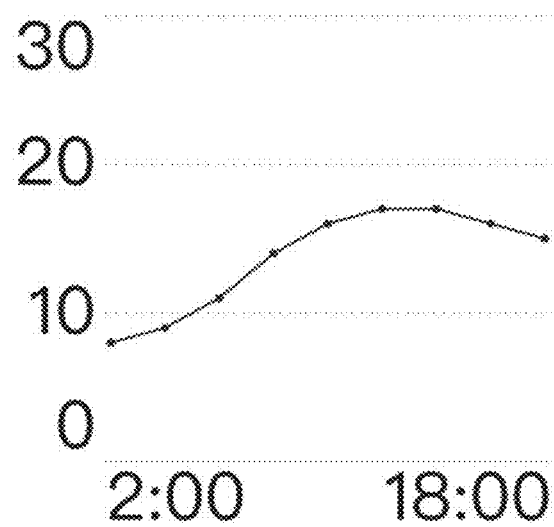
FIG. 2c is a schematic diagram of still another chart provided according to an embodiment of the present application.

Referring to FIG. 2a to FIG. 2c, FIG. 2a to FIG. 2c show schematic diagrams of three charts. The three charts corresponding to the same chart data.

A difference between the chart shown in FIG. 2a and the chart shown in FIG. 2b lies in the heights of the charts. In an example, in a case that the user triggers a height increase operation on the chart shown in FIG. 2a, the chart is updated to be the chart shown in FIG. 2b.

A difference between the chart shown in FIG. 2b and the chart shown in FIG. 2c lies in font sizes of the text labels of the number axis. In an example, in a case that the user triggers a label font size adjustment operation based on the chart shown in FIG. 2b, the chart is updated to be the chart shown in FIG. 2c.

From FIG. 2a to FIG. 2c, it can be seen that the layout of the text labels of the number axis is relatively reasonable using the solution of embodiments of the present application, and there is no problem of overlapping of text labels.

Exemplary Device

Based on the method provided by the above embodiments, the embodiments of the present application further provide an apparatus. The apparatus will be introduced below in conjunction with the accompanying drawings.

Figure 3:
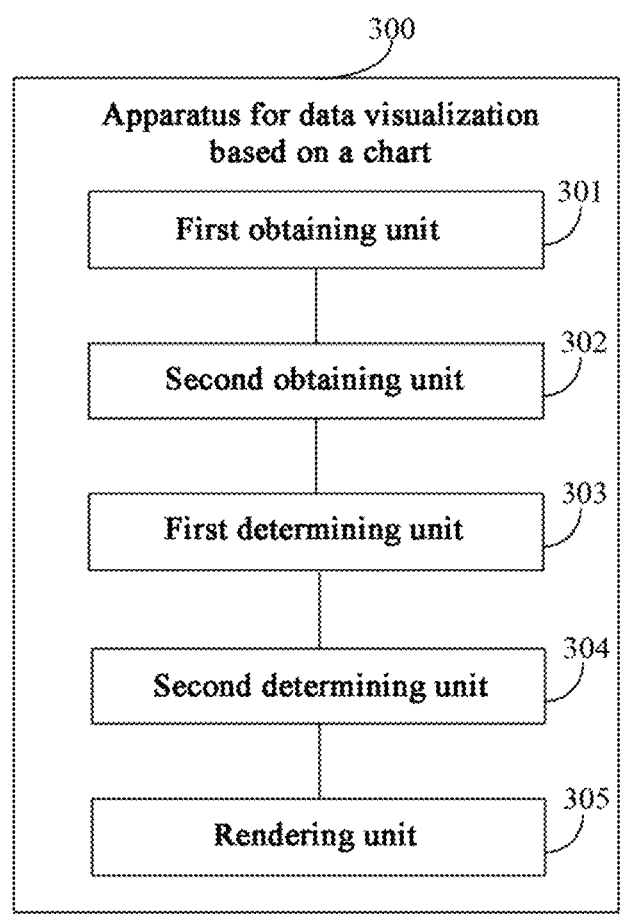
FIG. 3 is a schematic structural diagram of an apparatus for data visualization based on a chart provided according to an embodiment of the present application.

Referring to FIG. 3, this figure is a schematic structural diagram of an apparatus for data visualization based on a chart provided according to an embodiment of the present application. The apparatus 300 may specifically include, for example: a first obtaining unit 301, a second obtaining unit 302, a first determining unit 303, a second determining unit 304, and a rendering unit 305.

The first obtaining unit 301 is configured to obtain a size of a target number axis of a chart to be processed.

The second obtaining unit 302 is configured to obtain a font size of a text label corresponding to the target number axis.

The first determining unit 303 is configured to determine a proper label spacing corresponding to the target number axis according to the font size, wherein the proper label spacing is a space between any two adjacent text labels and enabling that the text labels included in the target number axis do not overlap.

The second determining unit 304 is configured to determine, according to the size and the proper label spacing, a quantity of the text labels included in the target number axis.

The rendering unit 305 is configured to render the chart to be processed based on the quantity of the text labels and chart data of the chart to be processed.

Optionally, the apparatus further includes a third obtaining unit configured to obtain a line spacing for the text label corresponding to the target number axis, wherein the first determining unit 303 is configured to determine the proper label spacing according to the font size and the line spacing.

Optionally, the second determining unit 304 is configured to determine, according to a result obtained by dividing the size by the proper label spacing, the quantity of the text labels included in the target number axis.

Optionally, the apparatus further includes a fourth obtaining unit configured to obtain a preset first correction parameter, wherein the first determining unit 304 is configured to determine, according to the first correction parameter and the result, the quantity of the text labels included in the target number axis.

Optionally, the apparatus further includes a fifth obtaining unit configured to obtain a second correction parameter set by a user, wherein the first determining unit 304 is configured to determine, according to the second correction parameter and the result, the quantity of the text labels included in the target number axis.

Optionally, the first obtaining unit 301 is configured to, in response to a chart size adjustment operation performed on the chart to be processed in a presentation interface of the chart to be processed, obtain an adjusted size of the target number axis, wherein the chart size adjustment operation includes a chart zoom-in operation or a chart zoom-out operation.

Optionally, the second obtaining unit 302 is configured to, in response to a label font size adjustment operation performed on the chart to be processed in a presentation interface of the chart to be processed, obtain an adjusted font size of the text label corresponding to the target number axis.

The apparatus 300 is an apparatus corresponding to the method for data visualization based on the chart provided by the above method embodiments. Specific implementations of all the units of the apparatus 300 belong to the same concept of the above method embodiments. Therefore, the specific implementation of all the units of the apparatus 300 can be found in the related descriptions of the above method embodiments, and will not be elaborated here.

The embodiments of the present application further provide an electronic device. The electronic device includes a processor and a memory.

The processor is configured to execute instructions stored in the memory to cause the device to perform the method for data visualization based on the chart provided by the above method embodiments.

The embodiments of the present application provide a computer-readable storage medium including instructions. The instructions instruct a device to perform the method for data visualization based on the chart provided by the above method embodiments.

The embodiments of the present disclosure provide a computer program product. The computer program product, when run on a computer, causes the computer to perform the method for data visualization based on the chart provided by the above method embodiments.

A person skilled in the art will easily come up with other implementations of the present application after considering this specification and implementing the invention disclosed here. The present application aims to cover any variations, uses, or adaptive changes of the present application, and these variations, uses, or adaptive changes follow the general principles of the present application and include common knowledge or customary technical means in the technical field that are not disclosed herein. The specification and the embodiments are considered as merely exemplary, and the scope and spirit of the present application are pointed out in the following claims.

It should be understood that the present application is not limited to the precise structures that have been described above and shown in the drawings, and various modifications and changes can be made without departing from the scope of the present application. The scope of the present application is subject only to the appended claims.

The aforementioned descriptions are merely preferred embodiments of the present application, but are not intended to limit present application. Any modification, equivalent replacement, or improvement made within the spirit and principle of present application shall fall within the protection scope of present application.

I claim:

1. A method for data visualization based on a chart, comprising:
    obtaining a size of a target number axis of a chart to be processed;
    obtaining a font size of a text label corresponding to the target number axis, and determining a proper label spacing corresponding to the target number axis according to the font size, wherein the proper label spacing is a space between any two adjacent text labels and enabling that text labels included in the target number axis do not overlap;
    determining, according to the size and the proper label spacing, a quantity of the text labels included in the target number axis;
    rendering the chart to be processed based on the quantity of the text labels and chart data of the chart to be processed; and
    obtaining a line spacing for the text label corresponding to the target number axis,
    wherein obtaining the font size of the text label corresponding to the target number axis comprises:
        in response to a label font size adjustment operation performed on the chart to be processed in a presentation interface of the chart to be processed, obtaining an adjusted font size of the text label corresponding to the target number axis,
wherein determining the proper label spacing corresponding to the target number axis according to the font size comprises:
determining the proper label spacing according to the font size and the line spacing, and
wherein determining the proper label spacing according to the font size and the line spacing comprises:
determining a product of the adjusted font size and the line spacing as the proper label spacing.

2. The method according to claim 1, wherein determining, according to the size and the proper label spacing, the quantity of the text labels included in the target number axis comprises:
determining, according to a result obtained by dividing the size by the proper label spacing, the quantity of the text labels included in the target number axis.

3. The method according to claim 2, further comprising:
obtaining a preset first correction parameter,
wherein determining, according to the result obtained by dividing the size by the proper label spacing, the quantity of the text labels included in the target number axis comprises:
determining, according to the first correction parameter and the result, the quantity of the text labels included in the target number axis.

4. The method according to claim 2, further comprising:
obtaining a second correction parameter set by a user,
wherein determining, according to the result obtained by dividing the size by the proper label spacing, the quantity of the text labels included in the target number axis comprises:
determining, according to the second correction parameter and the result, the quantity of the text labels included in the target number axis.

5. The method according to claim 1, wherein obtaining the size of the target number axis of the chart to be processed comprises:
in response to a chart size adjustment operation performed on the chart to be processed in the presentation interface of the chart to be processed, obtaining an adjusted size of the target number axis, wherein the chart size adjustment operation comprises a chart zoom-in operation or a chart zoom-out operation.

6. An electronic device comprising a processor and a memory,
wherein the processor is configured to, when executing instructions stored in the memory:
obtain a size of a target number axis of a chart to be processed;
obtain a font size of a text label corresponding to the target number axis, and determine a proper label spacing corresponding to the target number axis according to the font size, wherein the proper label spacing is a space between any two adjacent text labels and enabling that text labels included in the target number axis do not overlap;
determine, according to the size and the proper label spacing, a quantity of the text labels included in the target number axis;
render the chart to be processed based on the quantity of the text labels and chart data of the chart to be processed; and
in response to a label font size adjustment operation performed on the chart to be processed in a presentation interface of the chart to be processed, obtain an adjusted font size of the text label corresponding to the target number axis;
obtain a line spacing for the text label corresponding to the target number axis;
determine the proper label spacing according to the font size and the line spacing; and
determine a product of the adjusted font size and the line spacing as the proper label spacing.

7. The electronic device according to claim 6, wherein the processor is configured to:
determine, according to a result obtained by dividing the size by the proper label spacing, the quantity of the text labels included in the target number axis.

8. The electronic device according to claim 7, wherein the processor is further configured to:
obtain a preset first correction parameter; and
determine, according to the first correction parameter and the result, the quantity of the text labels included in the target number axis.

9. The electronic device according to claim 7, wherein the processor is further configured to:
obtain a second correction parameter set by a user; and
determine, according to the second correction parameter and the result, the quantity of the text labels included in the target number axis.

10. The electronic device according to claim 6, wherein the processor is configured to:
in response to a chart size adjustment operation performed on the chart to be processed in the presentation interface of the chart to be processed, obtain an adjusted size of the target number axis, wherein the chart size adjustment operation comprises a chart zoom-in operation or a chart zoom-out operation.

11. A non-transitory computer-readable storage medium comprising instructions, wherein the instructions configure a device to:
obtain a size of a target number axis of a chart to be processed;
obtain a font size of a text label corresponding to the target number axis, and determine a proper label spacing corresponding to the target number axis according to the font size, wherein the proper label spacing is a space between any two adjacent text labels and enabling that text labels included in the target number axis do not overlap;
determine, according to the size and the proper label spacing, a quantity of the text labels included in the target number axis;
render the chart to be processed based on the quantity of the text labels and chart data of the chart to be processed; and
in response to a label font size adjustment operation performed on the chart to be processed in a presentation interface of the chart to be processed, obtain an adjusted font size of the text label corresponding to the target number axis;
obtain a line spacing for the text label corresponding to the target number axis;
determine the proper label spacing according to the font size and the line spacing; and
determine a product of the adjusted font size and the line spacing as the proper label spacing.

12. The non-transitory computer-readable storage medium according to claim 11, wherein the device is configured to:

determine, according to a result obtained by dividing the size by the proper label spacing, the quantity of the text labels included in the target number axis.

13. The non-transitory computer-readable storage medium according to claim 12, wherein the device is further configured to:
obtain a preset first correction parameter; and
determine, according to the first correction parameter and the result, the quantity of the text labels included in the target number axis.

14. The non-transitory computer-readable storage medium according to claim 12, wherein the device is further configured to:
obtain a second correction parameter set by a user; and
determine, according to the second correction parameter and the result, the quantity of the text labels included in the target number axis.

15. The non-transitory computer-readable storage medium according to claim 11, wherein the device is configured to:
in response to a chart size adjustment operation performed on the chart to be processed in the presentation interface of the chart to be processed, obtain an adjusted size of the target number axis, wherein the chart size adjustment operation comprises a chart zoom-in operation or a chart zoom-out operation.

* * * * *